United States Patent
Martynov et al.

(10) Patent No.: US 11,372,885 B2
(45) Date of Patent: Jun. 28, 2022

(54) REPLICATION OF COMPLEX AUGMENTED VIEWS

(71) Applicant: SAP SE, Walldorf (DE)

(72) Inventors: Andrey Martynov, Bad Schoenborn (DE); Michael Haberkorn, Bad Schoenborn (DE); Milan Spasic, Heidelberg (DE); Alexander Becker, Mühlhausen (DE)

(73) Assignee: SAP SE, Walldorf (DE)

( * ) Notice: Subject to any disclaimer, the term of this patent is extended or adjusted under 35 U.S.C. 154(b) by 161 days.

(21) Appl. No.: 15/930,584

(22) Filed: May 13, 2020

(65) Prior Publication Data
US 2021/0357424 A1 Nov. 18, 2021

(51) Int. Cl.
| | |
|---|---|
| G06F 16/27 | (2019.01) |
| G06F 16/242 | (2019.01) |
| G06F 16/2453 | (2019.01) |
| G06F 16/22 | (2019.01) |
| G06T 11/60 | (2006.01) |

(52) U.S. Cl.
CPC .......... *G06F 16/27* (2019.01); *G06F 16/2282* (2019.01); *G06F 16/243* (2019.01); *G06F 16/2433* (2019.01); *G06F 16/24535* (2019.01); *G06T 11/60* (2013.01)

(58) Field of Classification Search
None
See application file for complete search history.

(56) References Cited

U.S. PATENT DOCUMENTS

| | | | |
|---|---|---|---|
| 2003/0208493 A1* | 11/2003 | Hall | G06F 16/289 |
| 2005/0097091 A1* | 5/2005 | Ramacher | G06F 16/24549 |
| 2005/0278458 A1* | 12/2005 | Berger | H04L 67/1097 |
| | | | 709/248 |
| 2006/0212465 A1* | 9/2006 | Fish | G06F 11/2097 |
| 2017/0017709 A1* | 1/2017 | Sarferaz | G06F 16/27 |
| 2020/0192891 A1* | 6/2020 | Hrastnik | G06F 16/24539 |

* cited by examiner

*Primary Examiner* — Joni Hsu
(74) *Attorney, Agent, or Firm* — Buckley, Maschoff & Talwalkar LLC

(57) ABSTRACT

Systems and methods include determination of an augmented view of a source system to be created in a target system, the augmented view including a structured query language view and annotations, and the augmented view associated with an object hierarchy, determination of a structured query language statement to create the augmented view in the source system, conversion of the structured query language statement to include augmented view names and augmented view field names, modification of one or more session context variables of the converted structured query language statement, creation of a target augmented view in the target system using the converted and modified structure query language statement, and creation of each object of the object hierarchy which is not an augmented view in the target system.

18 Claims, 11 Drawing Sheets

REPLICATION CONTROL PANEL

OBJECT NAME : I_GLAccountLineItemRawData

| Object Name | Object Type | Can Be Created | Can Be Loaded | Can Be Replicated | Current State | Action | Edit Action |
|---|---|---|---|---|---|---|---|
| ▽ I_GLAccountLineItemRawData | Augmented View | ☑ | ☑ | ☑ | No Action | Start Replication (incl. Initial Load) | ✎ |
| ▽ P_ACDOCA | Augmented View | ☑ | ☐ | ☐ | No Action | No Action | ✎ |
| ACDOCA | Table | ☑ | ☑ | ☑ | No Action | No Action | ✎ |

[ Execute ]

FIG. 6

REPLICATION CONTROL PANEL

OBJECT NAME : I_GLAccountLineItemRawData

| Object Name | Object Type | Can Be Created | Can Be Loaded | Can Be Replicated | Current State | Action | Edit Action |
|---|---|---|---|---|---|---|---|
| ▽ I_GLAccountLineItemRawData | Augmented View | ☑ | ☑ | ☑ | No Action | Create View | ✎ |
| ▽ P_ACDOCA | Augmented View | ☑ | ☐ | ☐ | No Action | Create View | ✎ |
| ACDOCA | Table | ☑ | ☑ | ☑ | No Action | Perform Initial Load | ✎ |

[Execute]

```
                                                    ,810
CREATE OR REPLACE VIEW "IFIJOURNALENTIT"
AS SELECT
          "IFIGLACCTLIR"."MANDT" AS "MANDT",      830
          "IFIGLACCTLIR"."SOURCELEDGER",
     820  "IFIGLACCTLIR"."COMPANYCODE",
          "IFIGLACCTLIR"."FISCALYEAR",
          "IFIGLACCTLIR"."ACCOUNTINGDOCUMENT",
          "IFIGLACCTLIR"."LEDGERGLLINEITEM",
     ...    ,810           ,820
FROM "IFIGLACCTLIR" "IFIGLACCTLIR"    ,810         ,820
     INNER JOIN "IFILDRSRCLDR" "IFILDRSRCLDR"    ,820
          ON ( "IFIGLACCTLIR"."MANDT" = "IFILDRSRCLDR"."MANDT" AND    830
               820  "IFIGLACCTLIR"."SOURCELEDGER" = "IFILDRSRCLDR"."SOURCELEDGER" )
     WHERE ( "IFIGLACCTLIR"."FISCALPERIOD" > N'000' OR       820
             ( "IFIGLACCTLIR"."FISCALPERIOD" = N'000' AND
               "IFIGLACCTLIR"."ACCOUNTINGDOCUMENTCATEGORY" = N'J' ) )
           820                                           830
```

*FIG. 8a*

```
                                                    ,815
CREATE OR REPLACE VIEW "CDS_VIEW_TEST"."I_JournalEntryItem"
AS SELECT
          "I_GLAccountLineItemRawData"."MANDT" AS "MANDT",       835
          "I_GLAccountLineItemRawData"."SourceLedger" AS "SourceLedger",   835
     825  "I_GLAccountLineItemRawData"."CompanyCode" AS "CompanyCode",
          "I_GLAccountLineItemRawData"."FiscalYear" AS "FiscalYear",  835     835
          "I_GLAccountLineItemRawData"."AccountingDocument" AS "AccountingDocument",
          "I_GLAccountLineItemRawData"."LedgerGLLineItem" AS "LedgerGLLineItem",
     ...    ,815                 835         ,825        835
FROM "I_GLAccountLineItemRawData" "I_GLAccountLineItemRawData"
     INNER JOIN "I_LedgerSourceLedger" "I_LedgerSourceLedger"  ,825    ,825
          ON ( "I_GLAccountLineItemRawData"."MANDT" = "I_LedgerSourceLedger"."MANDT" AND 830
               825 "I_GLAccountLineItemRawData"."SourceLedger" = "I_LedgerSourceLedger"."SourceLedger" )
     WHERE ( "I_GLAccountLineItemRawData"."FiscalPeriod" > N'000' OR   825
             ( "I_GLAccountLineItemRawData"."FiscalPeriod" = N'000' AND
               825 "I_GLAccountLineItemRawData"."AccountingDocumentCategory" = N'J' ) )
                                                             835
```

*FIG. 8b*

```
CREATE OR REPLACE VIEW "I_ProjectBasicData" AS
SELECT "PROJ"."MANDT" AS "MANDT", "PROJ"."PSPNR" ...
FROM "PROJ" "PROJ"
WHERE ( "PROJ"."MANDT" =
         SESSION_CONTEXT('AUG_CLIENT') )
```

*FIG. 9a*

```
CREATE OR REPLACE VIEW "I_ProjectBasicData" AS
SELECT "PROJ"."MANDT" AS "MANDT", "PROJ"."PSPNR" ...
FROM "PROJ" "PROJ"
WHERE ( 1 = 1 )
```

*FIG. 9b*

```
CREATE OR REPLACE VIEW "I_JointVentureMaster"
AS SELECT
"I_JointVentureMasterFld"."MANDT" AS "MANDT",
( DATS_TIMS_TO_TSTMP(
  "I_JointVentureMasterFld"."JntVntrDateCreated",
  "I_JointVentureMasterFld"."JntVntrTimeCreated",
  SYSTEM_TIMEZONE( CURRENT_SCHEMA,
  "I_JointVentureMasterFld"."MANDT",
  SESSION_CONTEXT(AUG_CLIENT),
  N'NULL') ...) ) AS "JntVntrCreationDateTime", ...
FROM "I_JointVentureMasterFld"
  "I_JointVentureMasterFld"
```

*FIG. 10a*

```
CREATE OR REPLACE VIEW "I_JointVentureMaster"  AS
SELECT
"I_JointVentureMasterFld"."MANDT" AS "MANDT", (
 DATS_TIMS_TO_TSTMP(
  "I_JointVentureMasterFld"."JntVntrDateCreated",
  "I_JointVentureMasterFld"."JntVntrTimeCreated",
  SYSTEM_TIMEZONE( CURRENT_SCHEMA,
  "I_JointVentureMasterFld"."MANDT",
  N'NULL') ...) ) AS "JntVntrCreationDateTime", ... FROM
"I_JointVentureMasterFld"
  "I_JointVentureMasterFld" ...
```

*FIG. 10b*

```
CREATE OR REPLACE VIEW "P_N_EmploymentMinPernr"
AS SELECT
"DETS"."CLIENT" AS "MANDT",
"KEYMAP"."BUSINESS_PARTNER_ID" AS
                              "PersonnelNumber", ...
FROM "WFD_D_ASSGMTDETS" "DETS"
INNER JOIN "WFD_D_KEYMAP" "KEYMAP" ON
     ( "KEYMAP"."WORKFORCE_ASSGMT_ID" =
       "DETS"."WORKFORCE_ASSGMT_ID" AND
     (( "DETS"."START_DATE" <=
         SESSION_CONTEXT( 'SYSTEM_DATE') AND
        "DETS"."END_DATE" >=
         SESSION_CONTEXT( 'SYSTEM_DATE') ) ) ...
```

*FIG. 11a*

```
CREATE OR REPLACE VIEW "P_N_EmploymentMinPernr"
AS SELECT
"DETS"."CLIENT" AS "MANDT",
"KEYMAP"."BUSINESS_PARTNER_ID" AS
                              "PersonnelNumber", ...
FROM "WFD_D_ASSGMTDETS" "DETS"
INNER JOIN "WFD_D_KEYMAP" "KEYMAP" ON
     ( "KEYMAP"."WORKFORCE_ASSGMT_ID" =
       "DETS"."WORKFORCE_ASSGMT_ID" AND
     (( "DETS"."START_DATE" <=
         to_dats( now ( ) ) AND
        "DETS"."END_DATE" >=
         to_dats( now ( ) ) ) ...
```

*FIG. 11b*

REPLICATION OF COMPLEX AUGMENTED VIEWS

BACKGROUND

Conventional database systems store large volumes of data related to many aspects of an enterprise. It is often desirable to mirror a portion of the data stored in one system (i.e., a source system) within another system (i.e., a target system). For example, it may be desirable to mirror objects stored in a source system which is particularly suited for data acquisition and storage within a target system which is particularly suited for data analysis.

A replication server may be used to create and update a target table in a target system which mirrors a source table in a source system. Such a replication server may also reactively apply changes in the source table to the target table. A user of the target system may utilize the data of the target table while such replication is active.

Database systems may store objects such as Structured Query Language (SQL) views, which select from one or more fields of one or more database tables (and/or other SQL views) and may be directly queried as a data source. Other objects include augmented views, such as but not limited to Core Data Service (CDS) views, which are similar to SQL views but may also include global and field-specific metadata annotations and associations to other augmented views. Conventional replication systems are unable to efficiently perform replication of such augmented views, particularly those associated with a complex hierarchy of underlying objects. Rather, in order to provide such an augmented view in a target system, the entirety of every database table contributing to the augmented view must be replicated separately and the augmented view must be manually created in the target system.

BRIEF DESCRIPTION OF THE DRAWINGS

FIG. 6 shows a user interface displaying available and recommended actions associated with objects of an augmented view hierarchy according to some embodiments.

FIG. 7 shows a user interface to displaying available and user-edited actions associated with objects of an augmented view hierarchy according to some embodiments.

FIGS. 8a and 8b illustrate SQL statements for creating an augmented view before and after parsing according to some embodiments.

FIGS. 9a and 9b illustrate parsing of an SQL statement including a client-related session context variable according to some embodiments.

FIGS. 10a and 10b illustrate parsing of an SQL statement including a client-related session context variable according to some embodiments.

FIGS. 11a and 11b illustrate parsing of an SQL statement including a date-related session context variable according to some embodiments.

DETAILED DESCRIPTION

The following description is provided to enable any person in the art to make and use the described embodiments. Various modifications, however, will remain readily-apparent to those in the art.

Some embodiments provide efficient replication of an augmented view associated with an underlying object hierarchy. Such replication may include a combination of loading or replicating objects of a portion of the object hierarchy in a target system and simply creating objects of another portion of the object hierarchy in the target system.

Briefly, a replication system according to some embodiments may determine an augmented view and a plurality of child objects of the augmented view. If the augmented view includes data allowing it to be loaded or replicated in a target system, an SQL view and a database table corresponding to the fields selected by the augmented view are created in the target system. The database table may thereafter receive updates from the replication system.

If the augmented view does not include data allowing it to be loaded or replicated in the target system, SQL statements for creating the augmented view and all underlying augmented views are converted to use augmented view field names, aliases and field names. Various session context variables of the converted statements may be removed or replaced as described below. Next, the augmented view and any underlying augmented views are created using the converted and modified SQL statements. Finally, all other underlying objects which do not exist in the target system are created in the target system.

According to some embodiments, available replication actions for the augmented view and underlying object hierarchy are determined based on metadata associated with the augmented view. Recommended actions may be determined based on the available actions, and the recommended actions may be changed by a user as desired.

Figure 1:
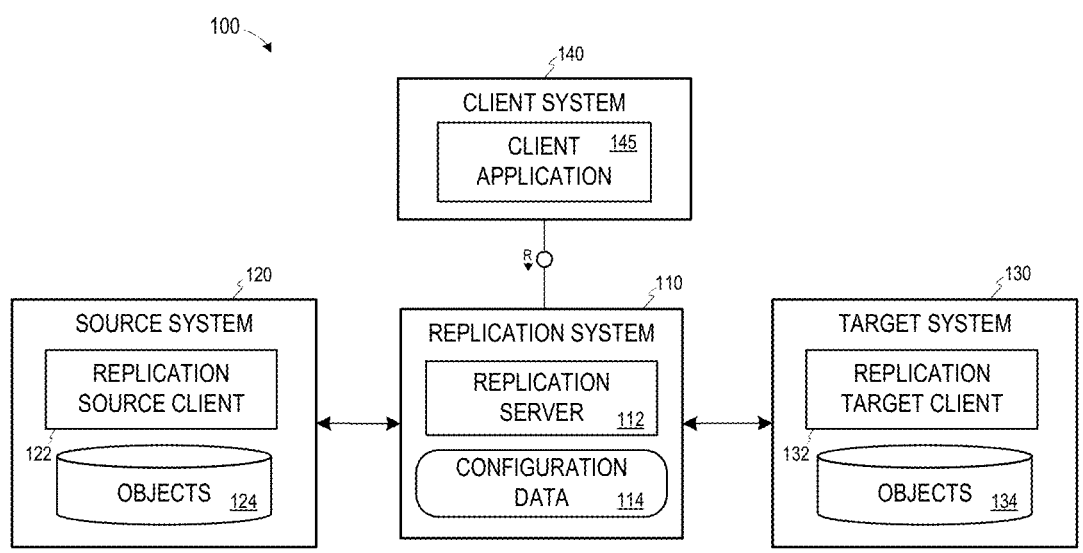
FIG. 1 is a replication architecture according to some embodiments.

FIG. 1 illustrates architecture 100 according to some embodiments. Architecture 100 includes replication system 110 for replicating objects from source system 120 into target system 130. Generally, replication system 110 may execute replication server 112 based on configuration data 114 to maintain a replica of one or more objects 124 of source system 120 in objects 134 of target system 130. Replication of an object 124 may include creation of the object in target system 130 without loading of any associated data, creation of the object in target system 130 and loading of associated data (i.e., initial loading), or initial loading and configuration of source system 120 to provide ongoing data updates based on changes to object 124.

A record of configuration data 114 may specify particular objects (e.g., tables, augmented views and SQL views) of a particular source system to be replicated in one or more particular target systems. Accordingly, although FIG. 1 illustrates only one source system and one target system, in some embodiments replication system 110 may replicate data from one or more source systems to one or more target systems. Configuration data 114 may further indicate additional object-specific parameters which govern replication of the objects.

Each of source system 120 and target system 130 may comprise any computing system capable of executing a database management system, of storing and independently managing data of one or more tenants and, in some embodiments, of supporting the execution of database server applications. Each of source system 120 and target system 130 may include a distributed storage system and/or distributed server nodes for performing computing operations as is known in the art. According to some embodiments, source system 120 is a data warehousing system and target system 130 is an in-memory database system configured to provide data analytics, but embodiments are not limited thereto.

Source system 120 may execute replication source client 122 to detect and record changes to configuration-specified ones of objects 124. For example, replication source client 122 may execute database triggers to detect changed records of a specified object and log the key field identifiers of the changed records. Replication server 112 uses the logged key field identifiers to retrieve the changed records from source system 120 and provides appropriate changes to appropriate ones of tables 134 via replication target client 132.

Client device system 140 executes client application 145 to communicate with replication system 110. Client application 145 may comprise code executing within a Web browser executed by client system 140 according to some embodiments. Client application 145 may communicate with replication server 112 to specify configuration data receive maintenance events 114 and to provide user instructions to replication server 112 for handling the events. Whether or not a user is presented with an event and/or options for handling the event may be based on the event type and/or source object type as will be described below.

The data stored within objects 124 and objects 134 may comprise one or more of conventional tabular data, row-based data, column-based data, and object-based data. According to some embodiments, replication server 112 operates to perform any transformations necessary to convert data from a format of objects 124 to a format of objects 134. The data may be distributed among several relational databases, dimensional databases, and/or other data sources.

Source system 120 or target system 130 may implement an in-memory database, in which a full database is stored in volatile (e.g., non-disk-based) memory (e.g., Random Access Memory). The full database may be persisted in and/or backed up to fixed disks (not shown). Embodiments are not limited to in-memory implementations. For example, source system 120 or target system 130 may store data in Random Access Memory (e.g., cache memory for storing recently-used data) and one or more fixed disks (e.g., persistent memory for storing their respective portions of the full database).

Figure 2:
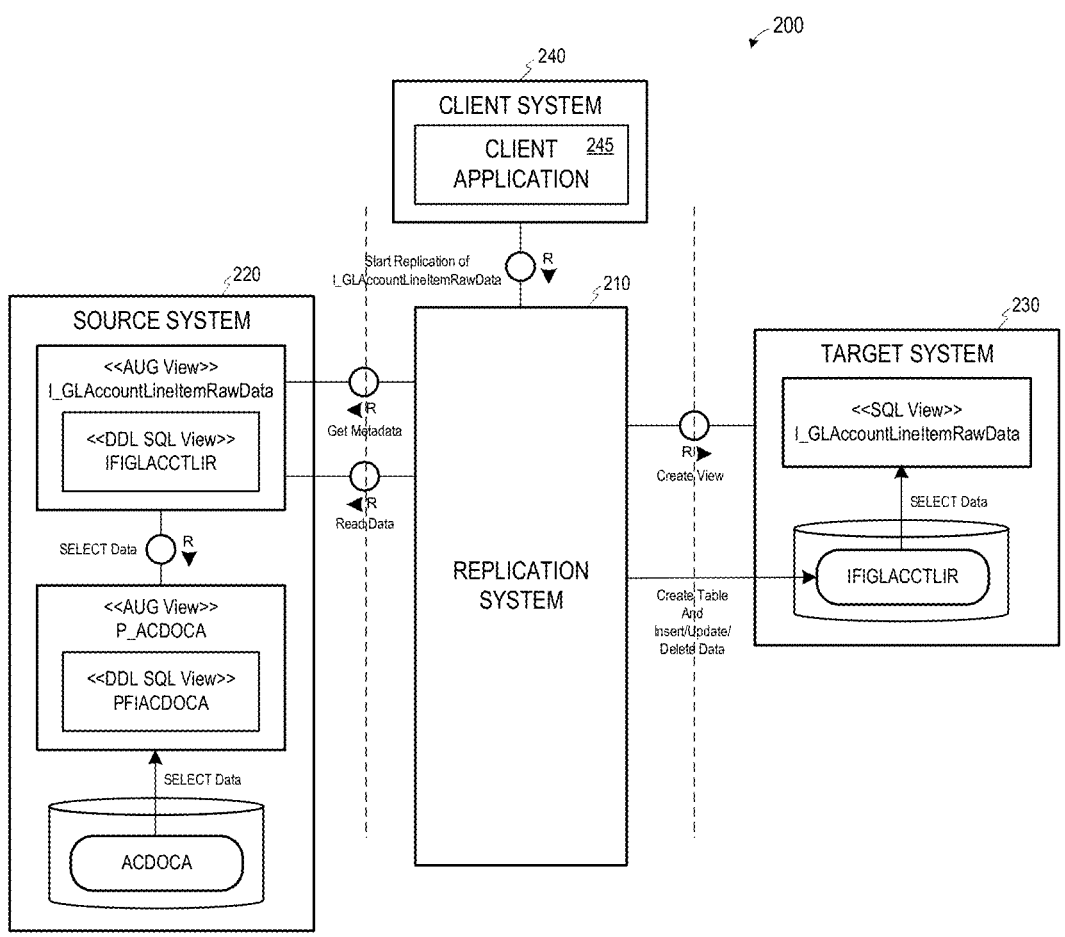
FIG. 2 is a replication architecture illustrating data extraction according to some embodiments.

FIG. 2 is a block diagram of system 200 to illustrate data extraction of an augmented view according to some embodiments. System 200 may be implemented by architecture 100 but embodiments are not limited thereto.

FIG. 2 shows augmented view I_GLAccountLineItemRawData, which includes SQL view IFIGLACCTLIR and additional annotations as described above. SQL view IFIGLACCTLIR may specify fields of one or more underlying views and tables to be included in augmented view I_GLAccountLineItemRawData. In the present example, the specified fields are fields of augmented view P_ACDOCA, which in turn includes SQL view PFIACDOCA. SQL view PFIACDOCA selects specified fields of database table ACDOCA.

Generally, during data extraction of an augmented view such as I_GLAccountLineItemRawData from source system 220, a single database table is created in target system 230 and named based on the name of the SQL view included within the augmented view (i.e., IFIGLACCTLIR). The database table includes only those fields of source system 220 which are selected by the SQL view. The database table is then populated with data from those fields which, in the illustrated example, are particular fields of database table ACDOCA.

In addition, an SQL view is created on top of this database table in target system 230. The SQL view has the same name and the same interface as the augmented view. Therefore, unlike a conventional view, the "materialized" data of the view is available in target system 230 in a consumer-ready format and need not be reconstructed every time the view is selected in target system 230. However, target system 230 may redundantly store some data in case that some data fields underlie several replicated augmented views.

The foregoing describes an initial load of the augmented view into target system 230. As will be described below, initial loading of an augmented view as shown in FIG. 2 may require that the augmented view includes an annotation indicating that the augmented view is enabled for initial loading.

Replication according to some embodiments may further include configuration of system 200 to update the database table of the target system (e.g., table IFIGLACCTLIR of system 230) to reflect subsequent changes to corresponding fields of the underlying database table(s) of the source system (e.g., table ACDOCA of system 220). According to some embodiments, database triggers are set for the underlying table(s) to detect changed records and to log the key field identifiers of the changed records. Replication server 210 may then use the logged key field identifiers to retrieve the changed records from source system 220 and provide appropriate changes to, e.g., table IFIGLACCTLIR. In order to support this functionality, the augmented view I_GLAccountLineItemRawData includes annotations to assist in determining which row(s) of table IFIGLACCTLIR should be updated based on the changed records retrieved from source system 220.

Figure 3:
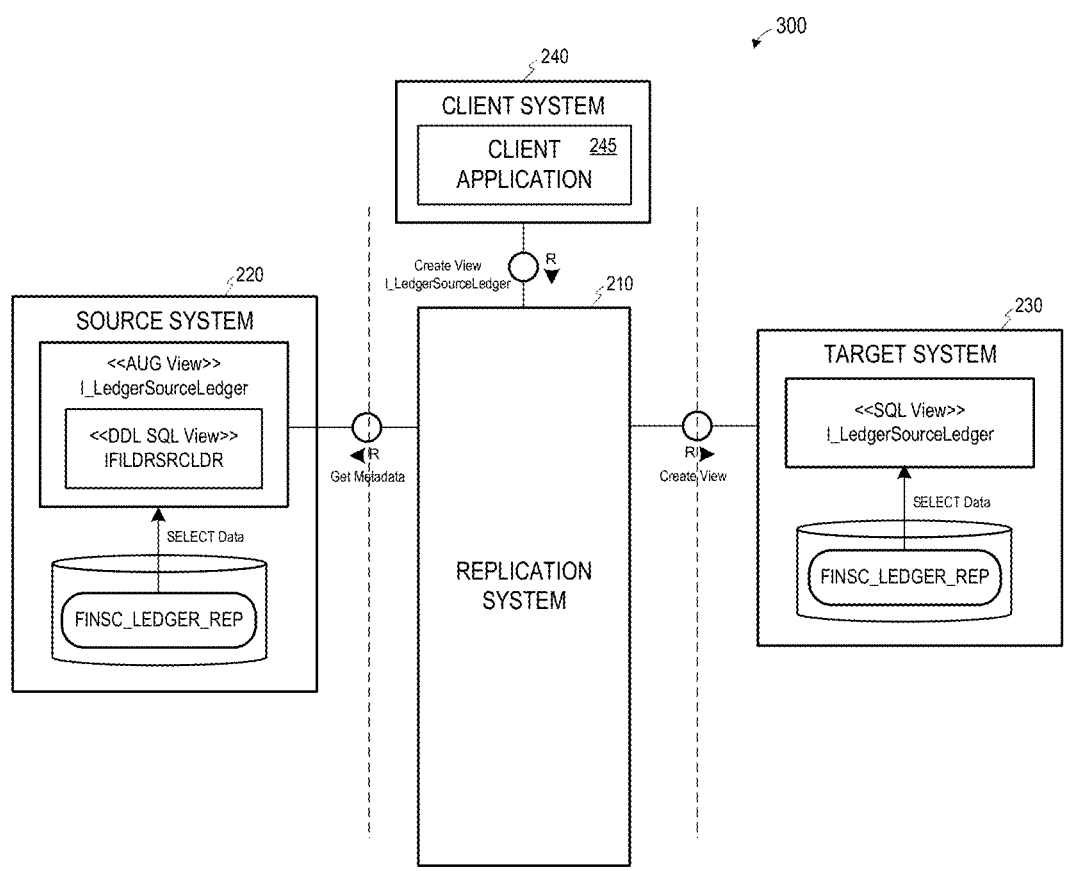
FIG. 3 is a replication architecture illustrating model extraction according to some embodiments.

FIG. 3 is a block diagram of system 300 to illustrate model extraction of an augmented view according to some embodiments. System 300 may be implemented by architecture 100 but embodiments are not limited thereto.

FIG. 3 shows augmented view I_LedgerSourceLedger, which includes SQL view IFILDRSRCLDR and additional annotations. SQL view IFILDRSRCLDR specifies fields of database table FINSC_LEDGER_REP. Embodiments are not limited to views which select fields from a single database table.

During model extraction, no data transferred from source system 220 to target system 230. Instead, the augmented view is created in target system 230 as an SQL view with the same name as the augmented view. A prerequisite to this creation is that all underlying artifacts (i.e., fields of database table FINSC_LEDGER_REP) which are selected by corresponding SQL view IFILDRSRCLDR in source system 220 must already be available in target system 230. If those artifacts are not already available, they will be created in target system 230 but not loaded with data. It should be noted that the underlying artifacts may undergo replication per conventional processes, such that a client may access the SQL view in the target system to obtain replicated data.

In contrast to data extraction, model extraction does not potentially create redundant data in the target system. However, data extraction results in more consistent data in the target system because the data is already calculated in the source system and need not be recalculated every time the view is accessed in the target system. In model extraction, the view in the target system must be reconstructed based on the replicated underlying data each time the view is accessed. Moreover, since JOIN conditions of a view require a complete and consistent data set, the corresponding data cannot be calculated and is not returned by the view until all data records are available.

Figure 4:
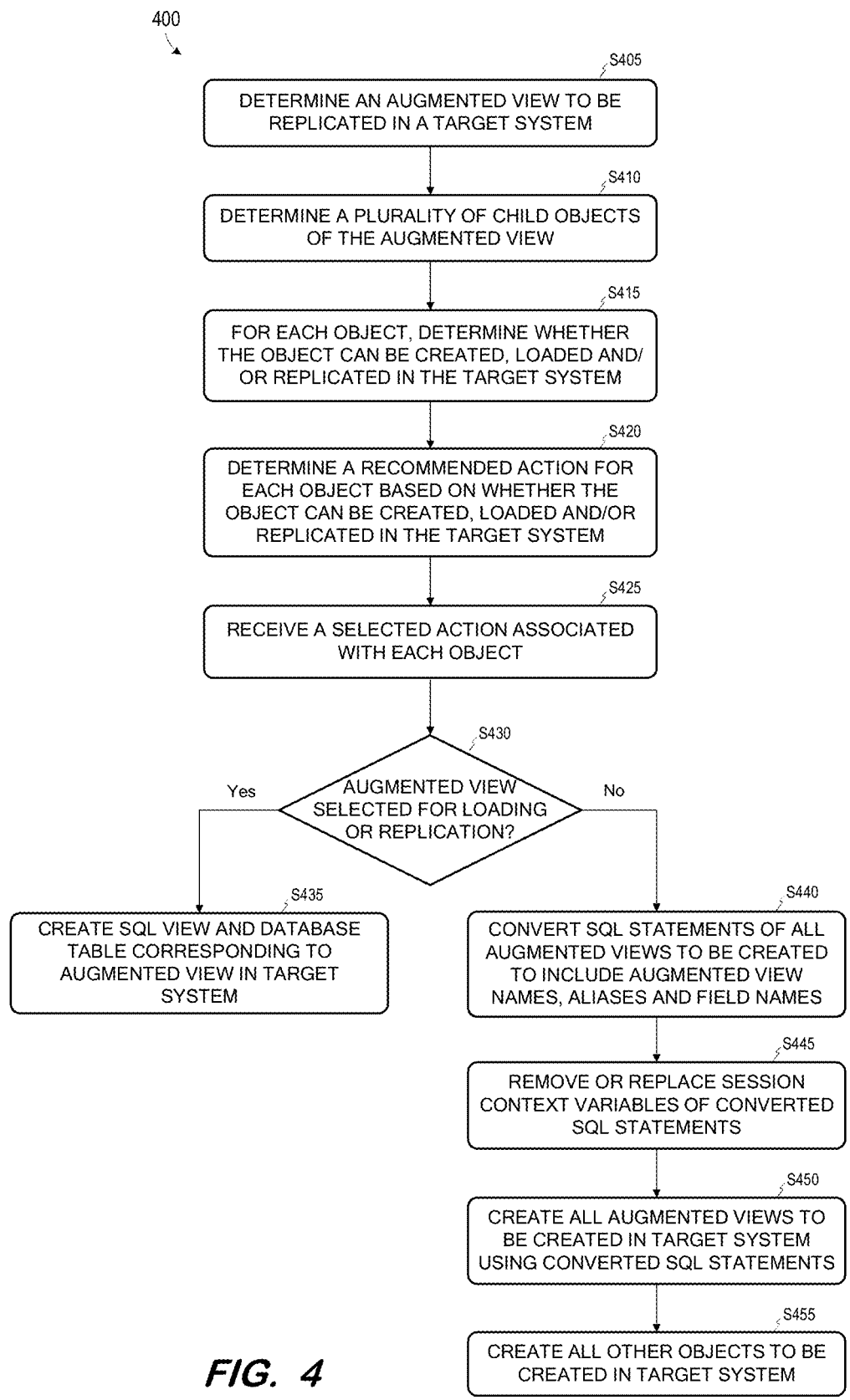
FIG. 4 is a flow diagram of a process to perform data extraction or model extraction according to some embodiments.

FIG. 4 comprises a flow diagram of process 400 to perform data extraction or model extraction according to some embodiments. An example of process 400 will be described with respect to the augmented view and object hierarchy of FIG. 2, but embodiments are not limited thereto.

Process 400 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

At S405, an augmented view to be replicated in a target system is determined. For example, a user of client system 240 may execute client application 245 to communicate with a control transaction of replication system 210. The control transaction may allow the user to select augmented view I_GLAccountLineItemRawData of source system 220 for replication. In this context, "replication" may refer to data extraction, model extraction, or a combination of both.

Next, a plurality of child objects of the augmented view is determined at S410. The child objects consist of any object in an object hierarchy extending from the augmented view through its underlying database table(s). In the present example, the child objects determined at S410 include augmented view P_ACDOCA and table ACDOCA.

At S415, and for the augmented view and each underlying object, it is determined whether the object may be created, loaded and/or replicated in the target system. In the case of an augmented view, database table object, or any underlying augmented views, it is determined that these objects may be created, loaded or replicated in the target system. In the case of an SQL view, it is determined that such objects can be created in the target system (e.g., via model extraction as described above).

According to some embodiments, S415 includes an evaluation of annotations associated with each augmented view of the hierarchy (including the top-level augmented view) to determine whether each augmented view can be loaded and/or replicated in the target system. The following is an example of an annotation in an augmented view indicating that the augmented view can be loaded:

```
@Analytics: {
    dataExtraction.enabled: true
}
```

The following is an example of an annotation in an augmented view indicating that the augmented view can be replicated:

```
@Analytics: {
    dataExtraction: {
        enabled: true,
        delta.changeDataCapture: {
            ...
        }
    }
}
```

In some embodiments, delta.changeDataCapture: { } provides information regarding the source database tables for which database triggers should be created and for calculating the augmented view which is affected by an underlying data change. This information is used as described above for data extraction-based replication.

A recommended action for each object is determined at S420. The recommended action for an object is determined based on whether the object can be created, loaded and/or replicated, as determined at S415. In some embodiments, the preferred recommended action is data extraction (i.e., initial load and replication) of the augmented view. If the augmented view is not enabled for such replication, it may be recommended to carry out data transfer at the object level as close as possible to the topmost level of hierarchy, which will reduce the required volume of transferred data.

Figure 5:
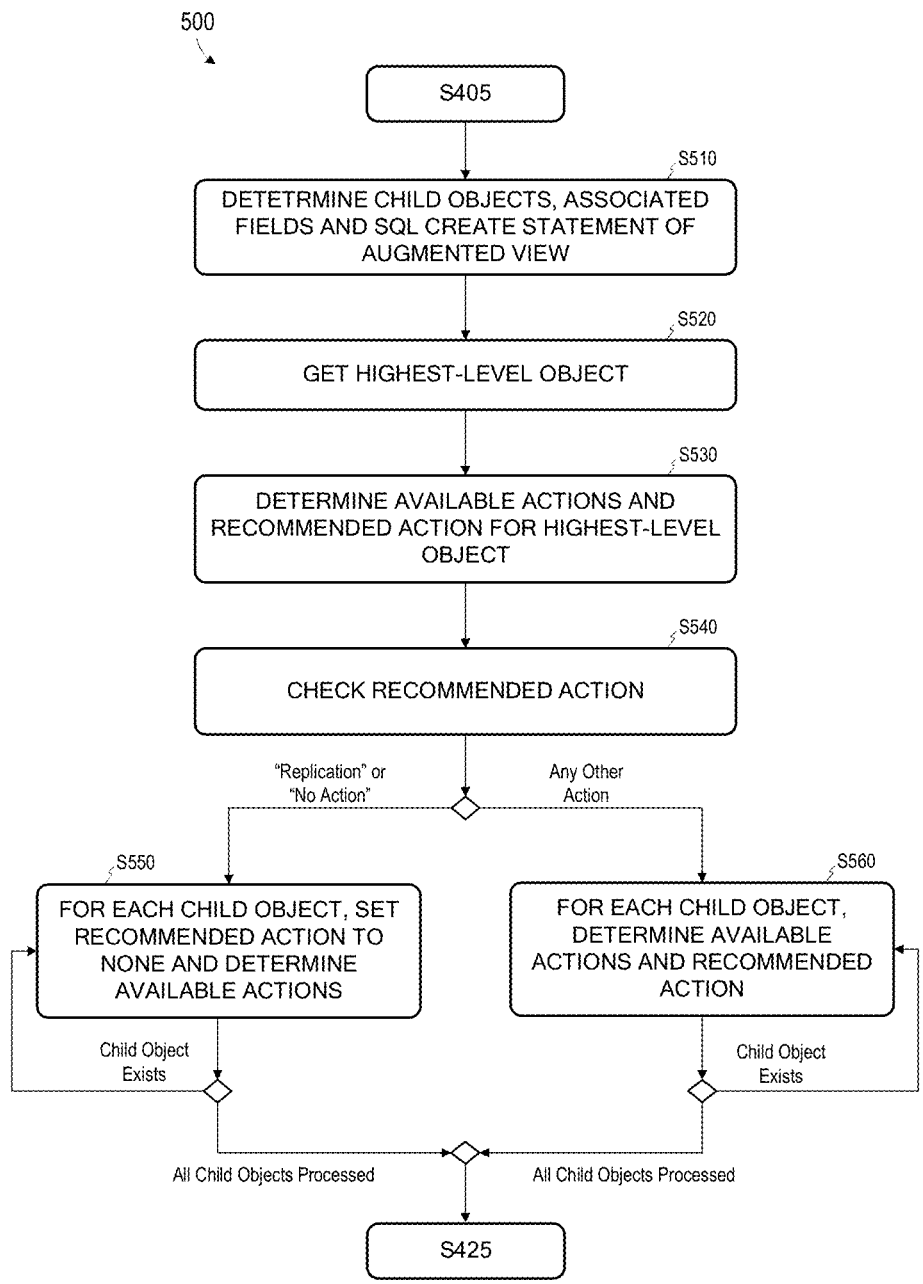
FIG. 5 is a flow diagram of a process to determine recommended actions associated with objects of an augmented view hierarchy according to some embodiments.

Process 500 of FIG. 5 is an implementation of S410-S420 of process 400 according to some embodiments. Process 500 attempts to materialize the augmented view at the highest level of the object hierarchy to provide the best consistency of the data within the target system.

At S510, all child objects of the hierarchy are determined as described with respect to S410. Also determined at S510 are the fields of which the augmented view consists and an SQL statement used by the source system to create the augmented view. Such information may be provided by an exporter tool executing on source system 220.

S520 includes identifying the highest-level object of the object hierarchy. At S530, available actions of the highest-level object are determined as described above with respect to S415. Based on the available actions, a recommendation is determined at S530. Assuming the above-stated goal of materializing the augmented view at the highest level of the object hierarchy, the determined recommended action is to replicate the highest-level object (i.e., the augmented view) if the highest-level object includes both the annotations described above. If not, and only the first annotation is included, a recommended action to load the object as illustrated in FIG. 2 (without subsequent replication) may be determined at S530. Finally, if neither annotation exists and the only available action is to create the augmented view in the target system (i.e., model replication per FIG. 3), then creation of the augmented view is the recommended action determined at S530.

The recommended action is checked at S540. If the recommended action is "replication" or "no action", flow proceeds to S550. At S550, for each child object of the next child level, the recommended action is set to "none" and the available actions (create, load and/or replicate) are determined as described above. Then, if another level of one or more child objects exists in the object hierarchy, flow returns to S550 and executes again with respect to the one or more child objects of the next level. Flow continues to cycle at S550 until the lowest level has been reached and all objects have been processed, at which point flow continues to S425 as described above.

Flow proceeds from S540 to S560 if the recommended action is determined at S540 to be any action other than "replication" or "no action". At S560, for each child object of the next child level the available actions (create, load and/or replicate) are determined and a recommended action is determined from the available actions as described above with respect to S530. If another level of one or more child objects exists in the object hierarchy, S550 executes again with respect to the one or more child objects of the next level and continues until the lowest level of the object hierarchy has been reached.

Accordingly, once flow reaches S425 of process 400, recommended actions have been determined for each object of the object hierarchy under and including the augmented view. These recommended actions may be presented to a user, who may edit and/or initiate execution of the actions.

FIG. 6 is a view of user interface 600 of a control transaction executed by replication system 210 according to some embodiments. User interface 600 presents the object hierarchy associated with a selected augmented view and recommended actions determined for each maintenance object. User interface 600 may be presented by client application 245 executing within client system 240 according to some embodiments.

User interface 600 presents an object hierarchy of augmented view I_GLAccountLineItemRawData shown in FIG. 2. In accordance with FIG. 2, the object hierarchy presented by user interface 600 includes augmented view I_GLAccountLineItemRawData, augmented view P_ACDOCA and table ACDOCA. User interface 600 also indicates the available actions determined for each object at S415.

Specifically, the "Can be Replicated" checkbox indicates that the object may be loaded into target system 230 and replicated using database triggers and logging tables as described above. Any database tables in the object hierarchy will be associated with this characteristic per conventional functioning of replication system 210. In the case of an augmented view, the "Can be Replicated" checkbox indicates that the augmented view includes both above-described annotations, and may be loaded and replicated in target system 230.

The "Can be Loaded" checkbox indicates that the object may be loaded into target system 230. Again, any database tables in the object hierarchy will be associated with this characteristic per conventional functioning of replication system 210. An augmented view will be indicated as "Can be Loaded" if the augmented view includes the "dataExtraction.enabled: true" (or similarly-functioning) annotation described above.

The "Can be Created" checkbox is checked for all objects, and indicates that the object may be created, without the loading of any data, in target system 230.

User interface 600 also indicates a current state of each object in the object hierarchy. If an object is currently undergoing replication, such state would be shown in the Current State column of interface 600.

The Action column of user interface 600 initially indicates a recommended action determined for each object. The value of the Action column for a given object may be changed using the corresponding Edit Action control. In the present example, and since augmented view I_GLAccountLineItemRawData is enabled for replication, the determined recommended action is to start replication after performing an initial load. In accordance with S550, the recommended actions of each other child object of the hierarchy are determined as "None". The foregoing recommended actions ensure materialization of the augmented view at the highest possible level of the object hierarchy to maximize data consistency.

According to some embodiments, selection of the Execute control results in reception at S425 of a selected action (i.e., the current value in the Action column) for each object in the object hierarchy. Next, at S430, it is determined whether the selected action included loading or replication of an augmented view. If so, as in the case of user interface 600, flow proceeds to S435.

At S435, an SQL view and a database table corresponding to the augmented view are created in the target system. S435 may proceed as described with respect to FIG. 2. For example, in the case of an initial load, an SQL view named I_GLAccountLineItemRawData and a database table named IFIGLACCTLIR are created in target system 230. As previously noted, IFIGLACCTLIR is the name of the SQL view within augmented view I_GLAccountLineItemRawData of source system 210. The database table IFIGLACCTLIR is then populated with data from appropriate fields of underlying database table ACDOCA.

In the case of a replication action, system 200 is also configured to update database table IFIGLACCTLIR of system 230 to reflect subsequent changes to corresponding fields of table ACDOCA of system 220. According to some embodiments, database triggers are set for the table ACDOCA to detect changed records and to log the key field identifiers of the changed records.

FIG. 7 illustrates user interface 600 after user editing of the values of the Action column. Specifically, the actions have been edited to indicate creation of the two augmented views and initial loading of the table ACDOCA. For example, the user may be aware that table ACDOCA is in the object hierarchy of several augmented views created in target system 230, and may wish to avoid redundant duplication of the table data as would occur if each of these augmented views were replicated in target system 230 via data extraction.

Flow proceeds from S430 to S440 if the selected action did not include loading or replication of an augmented view. For example, upon selection of Execute control of FIG. 7, flow proceeds to S440 to convert the SQL statements used to create the augmented views in the source system to augmented view names, aliases and field names. The SQL statements for each augmented view to be created in the target may be determined via the above-mentioned exporter tool. Such conversion may be required to address the inclusion of internal names in the SQL statements which do not conform to external naming conventions.

FIGS. 8a and 8b illustrate SQL statement conversion at S440 according to some embodiments. Specifically, the SQL statement of FIG. 8b is the result of replacing DDL SQL view names 810 of FIG. 8a with virtual data modeling view names 815 of FIG. 8b, replacing artifact aliases 820 with corresponding augmented view aliases 825, and replacing internal field names 830 with virtual data modeling-compliant field names 835.

The SQL statements used to create the augmented views in the source system may also include session context variables which are not defined in the target system. Accordingly, at S445, any session context variables which are present in the converted SQL statements are removed or replaced.

The session context variable AUG_CLIENT restricts the result of an accessed augmented view to the current client in the source system. In order to return the data of all clients when the replicated view is accessed in the target system, the session context variable is either removed as a condition or replaced with a corresponding client field of the underlying object.

For example, the session context variable AUG_CLIENT is a condition of the WHERE clause of SQL statement 900 of FIG. 9*a*. SQL statement 910 of FIG. 9*b* illustrates removal/replacement of the session context variable at S445 with an always TRUE condition (i.e., 1=1) according to some embodiments. In another example, SESSION_CONTEXT(AUG_CLIENT') of statement 1000 of FIG. 10*a* is replaced with corresponding client field "I_JointVentureMasterFld"."MANDT".

Source systems may include a session context variable which is used to compare data against the current date. According to some embodiments, this session context variable is replaced at S445 with a function to return a local time stamp. FIGS. 11*a* and 11*b* illustrate the replacement of session context variable SYSTEM DATE in SQL statement 1100 with function "now( )" in SQL statement 1110, which returns a local time stamp.

At S450, all augmented views which are to be created in the target system (e.g., augmented views I_GLAccountLineItemRawData and P_ACDOCA, per FIG. 7) are created in the target system using the converted SQL statements resulting from S445. Next, at S445, all other objects to be created in the target system are created. With respect to FIG. 7, S445 includes creation of table ACDOCA in target system 230 and performance of an initial load of data into the created table.

Figure 12:
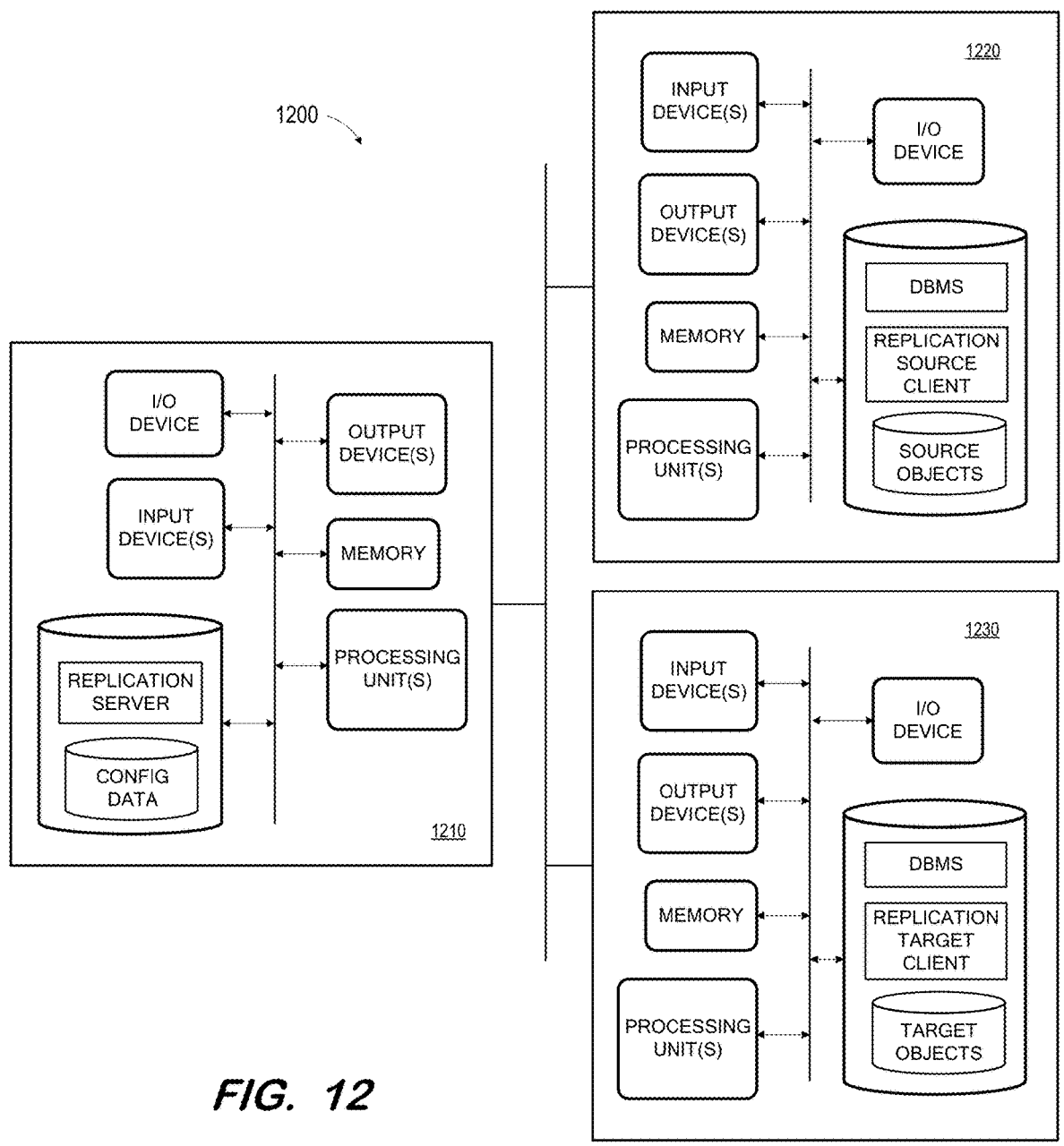
FIG. 12 is a block diagram of computing devices comprising a replication architecture for according to some embodiments.

FIG. 12 is a block diagram of system 1200 according to some embodiments. System 1200 includes replication system 1210, which may comprise an implementation of replication system 110 or 210. Similarly, source system 1220 may comprise an implementation of source system 120 or 220 and target system 1230 may comprise an implementation of target system 130 or 230. According to some embodiments, replication system 1210 may communicate simultaneously with many source systems and target systems to perform replication and reload of objects as specified by configuration information. Each of systems 1210, 1220 and 1230 may comprise a general-purpose computing apparatus and may execute program code using processing unit(s) to perform any of the functions described herein. Each of systems 1210, 1220 and 1230 may include other unshown elements according to some embodiments.

All data storage mentioned herein may be provided via combinations of magnetic storage devices (e.g., hard disk drives and flash memory), optical storage devices, Read Only Memory (ROM) devices, etc., while volatile memory may comprise Random Access Memory (RAM), Storage Class Memory (SCM) or any other fast-access memory.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable process steps;
a processing unit to execute the processor-executable process steps to cause the system to:
determine an augmented view of a source database system to be created in a target database system, the augmented view including a structured query language view and annotations, and the augmented view associated with a hierarchy of objects stored in the source database system;
determine a structured query language create statement associated with the augmented view in the source database system;
convert the structured query language create statement to include augmented view names and augmented view field names;
modify one or more session context variables of the converted structured query language create statement;
create a target augmented view in the target database system using the converted and modified structure query language create statement; and
create each object of the hierarchy of objects which is not an augmented view in the target database system.

2. A system according to claim 1, the hierarchy of objects comprising a second augmented view including a second structured query language view and second annotations, the processing unit to execute the processor-executable process steps to cause the system to:
determine a second structured query language create statement associated with the second augmented view in the source database system;
convert the second structured query language create statement to include second augmented view names and second augmented view field names;
modify a second one or more session context variables of the converted second structured query language create statement; and
create a second target augmented view in the target database system using the converted and modified second structure query language create statement.

3. A system according to claim 1, the processing unit to execute the processor-executable process steps to cause the system to:
receive an instruction to create the augmented view in the target database system.

4. A system according to claim 3, the processing unit to execute the processor-executable process steps to cause the system to:
- receive a second instruction to create a second augmented view of the source database system in the target database system, the second augmented view including a second structured query language view and annotations, and the second augmented view associated with a second hierarchy of objects stored in the source database system;
- create a second structured query language view in the target database system selecting fields selected by the second augmented view;
- create a database table in the target database system including the fields selected by the second structured query language view; and
- load the database table with data of corresponding fields of a corresponding one or more database tables of the source database system.

5. A system according to claim 4, wherein a name of the second structured query language view in the target database system is identical to a name of the second augmented view in the source database system, and
- wherein a name of the database table created in the target database system is a name of the second structured query language view in the source database system.

6. A system according to claim 5, the processing unit to execute the processor-executable process steps to cause the system to:
- replicate changes to the one or more database tables of the source database system to the database table in the target database system.

7. A computer-implemented method comprising:
- determining an augmented view of a source database system to be created in a target database system, the augmented view including a structured query language view and annotations, and the augmented view associated with a hierarchy of objects stored in the source database system;
- determining a structured query language create statement associated with the augmented view in the source database system;
- converting the structured query language create statement to include augmented view names and augmented view field names;
- modifying one or more session context variables of the converted structured query language create statement;
- creating a target augmented view in the target database system using the converted and modified structure query language create statement; and
- creating each object of the hierarchy of objects which is not an augmented view in the target database system.

8. A method according to claim 7, the hierarchy of objects comprising a second augmented view including a second structured query language view and second annotations, the method further comprising:
- determining a second structured query language create statement associated with the second augmented view in the source database system;
- converting the second structured query language create statement to include second augmented view names and second augmented view field names;
- modifying a second one or more session context variables of the converted second structured query language create statement; and
- creating a second target augmented view in the target database system using the converted and modified second structure query language create statement.

9. A method according to claim 7, further comprising:
- receiving an instruction to create the augmented view in the target database system.

10. A method according to claim 9, further comprising:
- receiving a second instruction to create a second augmented view of the source database system in the target database system, the second augmented view including a second structured query language view and annotations, and the second augmented view associated with a second hierarchy of objects stored in the source database system;
- creating a second structured query language view in the target database system selecting fields selected by the second augmented view;
- creating a database table in the target database system including the fields selected by the second structured query language view; and
- loading the database table with data of corresponding fields of a corresponding one or more database tables of the source database system.

11. A method according to claim 10, wherein a name of the second structured query language view in the target database system is identical to a name of the second augmented view in the source database system, and
- wherein a name of the database table created in the target database system is a name of the second structured query language view in the source database system.

12. A method according to claim 11, the processing unit to execute the processor-executable process steps to cause the system to:
- replicating changes to the one or more database tables of the source database system to the database table in the target database system.

13. A system comprising:
- a source database system storing an augmented view, the augmented view including a structured query language view and annotations, and the augmented view associated with a hierarchy of objects stored in the source database system;
- a target database system;
- a replication system to:
- determine a structured query language create statement associated with the augmented view in the source database system;
- convert the structured query language create statement to include augmented view names and augmented view field names;
- modify one or more session context variables of the converted structured query language create statement;
- create a target augmented view in the target database system using the converted and modified structure query language create statement; and
- create each object of the hierarchy of objects which is not an augmented view in the target database system.

14. A system according to claim 13, the hierarchy of objects comprising a second augmented view including a second structured query language view and second annotations, the replication system to:
- determine a second structured query language create statement to create the second augmented view in the source database system;
- convert the second structured query language create statement to include second augmented view names and second augmented view field names;

modify a second one or more session context variables of the converted second structured query language create statement; and create a second target augmented view in the target database system using the converted and modified second structure query language create statement.

15. A system according to claim 13, the replication system to:

receive an instruction to create the augmented view in the target database system.

16. A system according to claim 15, the replication system to:

receive a second instruction to create a second augmented view of the source database system in the target system, the second augmented view including a second structured query language view and annotations, and the second augmented view associated with a second hierarchy of objects;

create a second structured query language view in the target database system selecting fields selected by the second augmented view;

create a database table in the target database system including the fields selected by the second structured query language view; and load the database table with data of corresponding fields of a corresponding one or more database tables of the source database system.

17. A system according to claim 16, wherein a name of the second structured query language view in the target database system is identical to a name of the second augmented view in the source database system, and wherein a name of the database table created in the target database system is a name of the second structured query language view in the source database system.

18. A system according to claim 17, the replication system to:

replicate changes to the one or more database tables of the source database system to the database table in the target database system.

* * * * *